US 10,862,279 B2

United States Patent
Wensing (10) Patent No.: US 10,862,279 B2
(45) Date of Patent: Dec. 8, 2020

(54) ELECTRICAL SWITCHGEAR CABINET (71) Applicant: SSB WIND SYSTEMS GMBH & CO. KG, Salzbergen (DE)

(72) Inventor: Hendrik Wensing, Isterberg (DE)

(73) Assignee: NIDEC SSB WIND SYSTEMS GMBH, Salzbergen (DE)

(*) Notice: Subject to any disclaimer, the term of this patent is extended or adjusted under 35 U.S.C. 154(b) by 16 days.

(21) Appl. No.: 16/064,881

(22) PCT Filed: Jan. 11, 2017

(86) PCT No.: PCT/EP2017/050467
§ 371 (c)(1),
(2) Date: Jun. 21, 2018

(87) PCT Pub. No.: WO2017/121753
PCT Pub. Date: Jul. 20, 2017

(65) Prior Publication Data
US 2019/0006825 A1 Jan. 3, 2019

(30) Foreign Application Priority Data
Jan. 11, 2016 (DE) .................. 10 2016 000 137

(51) Int. Cl.
H02B 1/40 (2006.01)
H02B 1/30 (2006.01)
(Continued)

(52) U.S. Cl.
CPC ............ H02B 1/40 (2013.01); F03D 80/82 (2016.05); H02B 1/30 (2013.01); H02B 1/50 (2013.01); F05B 2220/706 (2013.01)

(58) Field of Classification Search
CPC ........................................ H02B 1/40
(Continued)

(56) References Cited

U.S. PATENT DOCUMENTS 3,895,179 A * 7/1975 Wyatt ............... H02B 1/50
174/50
5,011,033 A 4/1991 Roth
(Continued)

FOREIGN PATENT DOCUMENTS

CN 2632942 Y 8/2004
CN 202050185 U 11/2011
(Continued)

OTHER PUBLICATIONS

International Search Report (in English and German) and Written Opinion (in German) issued in PCT/EP2017/050467, dated Apr. 11, 2017; ISA/EP.
(Continued)

Primary Examiner — Stanley Tso
(74) Attorney, Agent, or Firm — Harness, Dickey & Pierce, P.L.C.

(57) ABSTRACT

The invention relates to a switchgear cabinet for a wind power plant, having a U-shaped base plate, comprising a bottom and two side parts, two end plates connected to the base plate, and a cover, by means of which the switchgear cabinet is closed, wherein the end plates are lengthened beyond the side parts or longitudinal sides formed by the latter, or the end plates are each set back at a distance with respect to an outer edge of the base plate, such that the base plate and/or the end plates form tabs projecting outward, which are useful for the fixing of holders.

7 Claims, 7 Drawing Sheets (51) Int. Cl.
*F03D 80/80* (2016.01)
*H02B 1/50* (2006.01)

(58) Field of Classification Search
USPC .......................................................... 174/520
See application file for complete search history.

(56) References Cited

U.S. PATENT DOCUMENTS

| | | | | |
|---|---|---|---|---|
| 8,899,431 | B1* | 12/2014 | Shotey | H02G 3/086 |
| | | | | 220/3.7 |
| 9,491,872 | B2 | 11/2016 | Thier | |
| 2012/0134809 | A1* | 5/2012 | Bagepalli | F03D 1/0658 |
| | | | | 416/1 |
| 2014/0103180 | A1* | 4/2014 | Birli | H02G 3/125 |
| | | | | 248/274.1 |
| 2015/0318677 | A1* | 11/2015 | Witherbee | H02G 3/126 |
| | | | | 248/218.4 |
| 2016/0049233 | A1* | 2/2016 | Jonas | H01F 27/06 |
| | | | | 174/520 |

FOREIGN PATENT DOCUMENTS

| | | |
|---|---|---|
| CN | 204335192 U | 5/2015 |
| DE | 102010034873 A1 | 2/2012 |
| DE | 102010060912 A1 | 5/2012 |
| EP | 1463167 A2 | 9/2004 |
| FR | 2884978 A1 | 10/2006 |
| JP | 2001051165 A | 2/2001 |
| JP | 2013538967 A | 10/2013 |

OTHER PUBLICATIONS

First Office Action in corresponding Japanese Patent Application No. 2018-534790 dated Jul. 29, 2019, 11 pp.

* cited by examiner

PRIOR ART

Fig. 1

PRIOR ART

Fig. 2

PRIOR ART

ELECTRICAL SWITCHGEAR CABINET

CROSS-REFERENCE TO RELATED APPLICATIONS

This application is a 371 U.S. National Stage of International Application No. PCT/EP2017/050467, filed Jan. 11, 2017, and claims priority to German Patent Application No. 10 2016 000 137.2 filed Jan. 11, 2016, the disclosures of which are herein incorporated by reference in their entirety.

The invention relates to a switchgear cabinet for a wind turbine, with a U-shaped base plate comprising a bottom and two side parts, two end plates connected to the base plate, and a cover which closes the switchgear cabinet.

In modern wind turbines, switchgear cabinets are required in the rotating part of the wind turbine—the hub—in order to adjust one or more rotor blades. Such switchgear cabinets are also known as pitch control cabinets. The integral electronics or electrics in the switchgear cabinets serve to control and regulate the rotor blade setting, and form a safety-relevant assembly in the wind turbine since, on a risk of overload from strong wind, they turn the rotor blades out of the wind. Such switchgear cabinets are subject to almost permanent rotational movement and very extreme mechanical loads (e.g. vibrations) and environmental conditions (e.g. corrosion).

In general switch cabinet construction, switch cabinets are normally box-shaped and characterised by a bottom, side parts and a cover. In addition, modular switchgear cabinet systems for use in wind turbines are known from DE 10 2010 034 873 A1 or DE 10 2010 060 912 A1.

Normally, primarily in the bottom region of the switchgear cabinets, openings are provided for mounting by means of connecting systems such as bolts, or brackets are welded to the cabinet. To be able to attach brackets to the cabinet, in particular releasably, preferably openings or bores are provided in the cabinet in order to allow e.g. a screw connection. These openings however increase the risk that water can penetrate the cabinet at these points.

All connecting elements in wind turbines must be inspected regularly to check whether they have loosened due to vibrations for example. Since the connecting elements in the switchgear cabinets are often fitted via or covered by other components, this is associated with high cost or no inspection is performed.

In switchgear cabinets provided in wind turbines in particular, electrical energy accumulators such as batteries or capacitors are fitted for emergency power supply. Because of the high electrical voltages, there is a direct danger to life on touching components carrying electrical voltage. These electrical voltages cannot be completely diverted away. Here, there is a direct danger to the fitter or service engineer since he must work with tools close to electrically live components when fitting or inspecting the connecting elements. This is the case whenever the connecting elements for the brackets must be installed or inspected.

Furthermore, the force path from the brackets to the switchgear cabinet of the wind turbine in rotating operation is not optimal, since mechanical stress peaks occur at the transitions from the brackets to the cabinet. A further disadvantage is that in switchgear cabinets with welded brackets, these are not connected releasably to the cabinet and hence are not modular or cannot be exchanged. When wiring the switchgear cabinets, the brackets are sometimes in the way since they protrude beyond the cabinet itself. Also, cabinets with brackets are significantly heavier, which means a higher load on the workers. Since the material thickness of the brackets is normally considerably thicker than that of the cabinet itself, in production the welding process is very complex in order to achieve for example the required tolerances and weld seam qualities. Normally, the switchgear cabinet has a material thickness of 2 mm and the brackets 6 mm.

Also, often mechanical stress peaks occur at or in the transitions in material thickness from the 2 mm to 6 mm. Material failures normally occur at these material transitions. To reduce welding distortion, the brackets are often not welded to the cabinet all around. As a result, gaps are present between the parts to be joined together, which can cause problems in particular in stainless steel switchgear cabinets as are normally fitted in wind turbines. When welding stainless steel, for example tempering colours occur which must be removed. The conventional methods for after-treating the weld seams include brushing, blasting e.g. with glass beads, or pickling. Brushing however can only remove the tempering colours inadequately in the region of the gaps. Furthermore, on blasting, the blasting product can settle in the gaps. In operation in the wind turbine, the blasted product can then detach under vibration, settle in the electrical/electronic components and block their function, whereby the wind turbine rotor blades can no longer be turned out of the wind, which may lead to total failure of the turbine. If the tempering colours are to be removed by pickling, all pickling residue must be removed, else increased corrosion can occur. This is not however possible because of the gaps. Also, when coating switchgear cabinets, gaps are a problem since these are not necessarily closed by the coating, so that corrosion can occur there. A further disadvantage of the prior art has been found in practice to be that the weld seams frequently lie in plate bends of the switchgear cabinet. Bending (which in particular is associated with crushing and stretching of the material) however causes material weakening. Therefore in practice, the weld seams should as far as possible not lie in the region of bends, since the weld seams also cause weakening of the material due to the heat application.

The object of the invention is to propose a switchgear cabinet, preferably for use in the rotating part of a wind turbine, which in particular comprises brackets which may be attached preferably in modular and/or releasable fashion, without the need for respective connecting elements inside the cabinet. Advantageously, furthermore, preferably in stainless steel cabinets, the tempering colours of the weld seams can be reliably removed by pickling, blasting, e.g. glass bead blasting, or by brushing, and/or metal switchgear cabinets can be reliably coated (e.g. by dip coating, powder coating, cathode dip coating). The geometry of the cabinet and the brackets should in particular remain as simple as possible, so that cost benefits are achieved. Also, the switchgear cabinets and brackets preferably form a unit so that the forces occurring in operation of the wind turbine do not lead to damage of the cabinet and/or brackets, and/or so that mechanical stress peaks at the transitions from thick to thin plates can be reduced. The switchgear cabinet in particular should be closed apart from the cover, so that no water can penetrate.

This object is achieved according to the invention by the switchgear cabinet according to claim 1. Preferred refinements of the invention are given in the subclaims and in the description which follows.

The switchgear cabinet according to the invention, in particular for or on a wind turbine, has a U-shaped base plate comprising a bottom and two side parts which are preferably made from a sheet, two end plates connected to the base plate, and a cover which closes the switchgear cabinet, wherein either the end plates, in particular at the sides, extend beyond the side parts or longitudinal sides formed by the latter, or the end plates are each set back by a preferably defined distance from an outer edge of the base plate, in particular on the end face, such that the base plate and/or the end plates form outwardly protruding tabs. Preferably, the tabs may be used in particular for outer or external fixing purposes, and/or for fixing and/or attaching brackets, and/or for attaching the switchgear cabinet for example to brackets. In particular, the tabs may be used for fixing, for example directly or indirectly, the switchgear cabinet to the or a wind turbine.

Due to the outwardly protruding tabs, it is possible to attach the switchgear cabinet by means of the tabs to brackets and/or to a wind turbine without the need to provide connecting elements inside the switchgear cabinet and/or fixing holes extending into the interior of the switchgear cabinet. This avoids any sealing problems and/or opening of the switchgear cabinet for its fitting or removal. In particular, the invention creates the possibility of being able to attach the brackets to the cabinet, preferably in modular fashion, outside the actual switchgear cabinet geometry. Preferably, the invention furthermore creates the possibility of being able to take account of an optimal force path and/or force transfer to the brackets. In particular, the bottom may also be called the bottom part.

According to a first variant, the tabs are formed e.g. by the bottom and the side parts. According to a second variant, the tabs are formed e.g. by or only by the side parts. According to a third variant, the tabs are formed e.g. by the bottom and one or just one of the side parts.

According to one embodiment, the side parts are folded outward at right angles at their end regions, wherein the extended regions of the end plates, in particular the regions extended beyond the side parts or longitudinal sides, together with the folded regions of the side parts, form the tabs. In this way, in particular a material doubling can be achieved. Preferably, the folded regions of the side parts lie on the extended regions of the end plates, in particular the regions extended beyond the side parts or longitudinal sides.

The number of tabs is preferably two or at least two, or three or at least three, or four or at least four, or six or at least six. Preferably, the tabs are flat or are each formed flat.

According to a refinement, two neighbouring and/or adjacent tabs enclose a or a respective right angle with each other. For example, two or two respective tabs formed by the side parts, with one or a respective one of the tabs formed by the bottom, enclose a or a respective right angle. Preferably, two or two respective tabs formed by the side parts, together with one or a respective one of the tabs formed by the bottom, form a or a respective U-shaped tab arrangement.

According to one embodiment, one or at least one bracket is provided. Preferably the or the at least one bracket is fixed to at least one of the tabs. For example, the or the at least one bracket is bolted and/or riveted and/or welded to the at least one tab. Preferably, the or the at least one bracket lies with a flat contact face on the at least one tab. Preferably, the or the at least one bracket is attached to two, three or more tabs. For example, the or the at least one bracket is screwed and/or riveted and/or welded to the two or three or more tabs. Preferably, the or the at least one bracket lies with a or a respective flat contact face on the two or three or more tabs. In the case of three tabs, these preferably form the or a U-shaped tab arrangement.

According to a refinement, two or more brackets are provided. Preferably, each of the brackets is attached to at least one of the tabs. For example, each of the brackets is screwed and/or riveted and/or welded to the or the respective at least one tab. Preferably, each of the brackets lies with a flat contact face on the or the respective at least one tab. Preferably, each of the brackets is attached to two or three or more of the tabs. For example, each of the brackets is screwed and/or riveted and/or welded to the or the respective two or three or more tabs. Preferably, each of the brackets lies with a flat contact face on the or the respective two or three or more tabs. For each of the brackets attached to three of the tabs, the or the respective tabs preferably form the or a U-shaped tab arrangement.

Preferably, the switchgear cabinet is attached by the tabs and/or by the or the at least one bracket to the or a wind turbine, and/or on or in a rotating part of the or a wind turbine, preferably by means of one or more screw connections and/or one or more rivet connections and/or one or more weld connections. For example, the bracket is or the brackets are screwed and/or welded to the or the respective or a wind turbine and/or to the or a rotating part of the or a wind turbine. In particular, the switchgear cabinet is attached and/or fixed on or in the or a rotating part of the or a wind turbine. The rotating part is or comprises preferably a rotor and/or a hub (rotor hub). Advantageously, the rotor comprises the hub. In particular, the rotating part is rotatable about a rotor axis. Advantageously, several rotor blades are attached and/or mounted on the rotating part and/or the hub. In particular, the rotor blades are each mounted on the rotating part and/or the hub so as to be rotatable about a blade axis.

According to one embodiment, fixing holes are provided in at least one tab or the tabs. In particular, fixing means extend through the or some of the fixing holes, by means of which fixing means the at least one tab is or the tabs are respectively attached to the bracket or at least one of the brackets, and/or to the or a wind turbine and/or to the or a rotating part of the or a wind turbine. Preferably, holes are provided in the or the at least one bracket or brackets and/or in the or a wind turbine and/or in the or a rotating part of the or a wind turbine, through which holes the fixing means extend. These holes are in particular brought to overlap with the or some of the fixing holes. Preferably, the fixing means form or comprise rivets and/or screws and/or bolts.

According to a refinement, fixing holes are provided in the or the at least one bracket or the brackets. In particular, fixing means extend through the or some of the fixing holes, by means of which fixing means the or the at least one bracket is or the brackets are respectively attached to the or a wind turbine and/or to the or a rotating part of the or a wind turbine. Preferably, holes are provided in the or a wind turbine and/or in the or a rotating part of the or a wind turbine, through which holes the fixing means extend. These holes are in particular brought to overlap with the or some of the fixing holes. Preferably, the fixing means comprise rivets and/or screws and/or bolts.

According to one embodiment, additional folds are provided on the base plate and/or on at least one of the end plates, so that a or at least one additional plane is created on the base plate and/or on the at least one end plate.

According to a refinement, the end plates are fixedly and/or rigidly connected to the base plate. Preferably, the end plates are welded or glued to the base plate. In particular, the switchgear cabinet is tightly welded all round apart from the cover.

Preferably, the base plate together with the end plates forms a base body which in particular is box-shaped. Advantageously, the base body and/or the switchgear cabinet comprises a switchgear cabinet opening which in particular is closed by the cover. Preferably, the switchgear cabinet is box-shaped. Preferably, the bottom or the bottom face of the base plate is rectangular, square or polygonal. For example, the switchgear cabinet forms a cube, a cuboid or a prism. Preferably, the side parts and the end plates form an in particular closed peripheral wall of the switchgear cabinet and/or the base body.

The side parts preferably lie opposite each other and/or are arranged preferably opposite each other. Preferably, the base plate is also formed mirror-symmetrically or substantially mirror-symmetrically relative to a centre plane. Advantageously, the side parts are formed and/or arranged mirror-symmetrically or substantially mirror-symmetrically relative to the centre plane. Preferably, the side parts form long sides or the longitudinal sides of the switchgear cabinet. In particular, the centre plane and/or the side parts and/or the longitudinal sides run in a longitudinal direction.

The side parts are preferably folded and/or bent from the base plate and/or the bottom. Advantageously, the base plate consists of a sheet or a single sheet. Preferably, the side parts and the bottom are made from a single and/or common sheet. The base plate consists preferably of metal. For example, the base plate consists of a lightweight metal e.g. aluminium. Advantageously, the base plate consists of a ferrous material e.g. steel, preferably stainless steel. The phrase that the base plate is U-shaped means in particular that the base plate is U-shaped in cross-section and/or has a U-shaped form. Preferably, the legs of the U shape or the U-shaped cross section are formed by the side parts of the base plate. Advantageously, the bottom of the U shape and/or U-shaped cross-section is formed by the bottom of the base plate.

Preferably, the end plates lie opposite each other, in particular in the or a longitudinal direction, and/or are arranged preferably opposite each other, in particular in the or a longitudinal direction. Preferably, the end plates are arranged and/or oriented transversely to the centre plane and/or the side parts and/or the longitudinal sides. Preferably, the centre plane runs in the longitudinal direction. Advantageously, the end plates are arranged between the side parts and/or the end plates extend preferably between the side parts, and/or the end plates extend preferably from one of the side parts to the or another of the side parts. In particular, the end plates form the end sides of the switchgear cabinet. Advantageously, the end plates consist of a sheet and/or a respective sheet. Preferably, the end plates consist of metal. For example, the end plates consist of a lightweight metal e.g. aluminium. Advantageously, the end plates consist of a ferrous material e.g. steel, preferably stainless steel.

The cover preferably consists of plastic or metal. For example, the cover consists of a lightweight metal e.g. aluminium. Advantageously, the cover consists of a ferrous material, e.g. steel, preferably stainless steel.

Preferably, the or the at least one bracket consists or the brackets consist of a sheet and/or a respective sheet. Preferably, the or the at least one bracket consists or the brackets consist of plastic or metal and/or respectively plastic or metal. For example, the or the at least one bracket consists or the brackets consist of and/or respectively consist of a lightweight metal, e.g. aluminium. Advantageously, the or the at least one bracket consists or the brackets consist of and/or respectively consist of a ferrous material, e.g. steel, preferably stainless steel. The or the at least one bracket consists or the brackets consist for example of a different material from the base plate and/or the end plates and/or the cover and/or the switchgear cabinet. Preferably, the or the at least one bracket, or at least one of the brackets, or the or several or two of the brackets, has or have a or a respective end region which faces the switchgear cabinet and is U-shaped and/or U-shaped in cross-section, and by means of which the or the at least one or the respective bracket is attached preferably to the or the respective tabs.

According to one embodiment, the switchgear cabinet and/or the interior of the switchgear cabinet contains components and/or assemblies and/or mounting plates which are in particular attached to the switchgear cabinet. Advantageously, the components and/or assemblies and/or mounting plates are attached to the cabinet by bolts or nuts. In particular, the bolts or nuts are arranged in the switchgear cabinet and/or in the interior of the switchgear cabinet. Preferably, the components and/or assemblies are or comprise electrical and/or electronic components and/or assemblies and/or batteries and/or capacitors. Advantageously, at least one pitch angle control system is provided in the switchgear cabinet and/or in the interior of the switchgear cabinet, by means of which the pitch angle or angles of one or more rotor blades of the or a wind turbine can be controlled and/or regulated. The switchgear cabinet is in particular an electrical switchgear cabinet and/or a pitch control cabinet.

Preferably, the switchgear cabinet is made from three types of parts, the U-shaped base plate, the two end plates and the cover, wherein the base plate consists of the bottom with the two side parts (longitudinal sides) which in particular of made from a or the one sheet. Advantageously, the end plates are connected at a defined distance from the outer edge of the base plate, so that the bottom and the side parts form tabs which in particular may be used for attaching the brackets.

An optimal force transmission from the thick brackets to the thin-walled cabinet is achieved in particular if the or each bracket forms a plane with the tabs of the switchgear cabinet formed by the side parts or the bottom part. Thus the forces are transferred longitudinally from the brackets into the plate and vice versa. In this direction, the plates can absorb very high forces. This is guaranteed in all three directions or spatial directions (x, y, z). The mechanical stress peaks which normally occur at the transition from the thick brackets to the thin switchgear cabinet plate are thus greatly reduced.

The switchgear cabinet in particular comprises no openings, apart from the cover and/or apart from the switchgear opening closed by the cover, in which water could penetrate since the cabinet interior is preferably tightly welded all round. The switchgear cabinet according to the invention therefore in particular has a very simple geometry and may be made of different materials, e.g. stainless steel or steel, which entails cost benefits. In the case of special steel switchgear cabinets, for example the tempering colours which occur on welding and must be removed, can be reliably removed using almost all conventional methods such as brushing, pickling or glass bead blasting. Also coating switchgear cabinets made of steel or special steel does not lead to problems since there are no longer any gaps in which residue of blasting product or pickle can settle.

Preferably, the brackets are bolted to the cabinet only from the outside, so that there is no need to open the cabinet to inspect this connection. The danger of electric shock is thus excluded. Furthermore, the brackets may be made from a different material from that of the cabinet. Preferably, the brackets are modular and may also be attached only after equipping the switchgear cabinet. Very few or no welding distortions are expected, so very tight tolerances can be maintained. The switchgear cabinet may however also be attached to the end product without additional brackets. In connection with the brackets, the switchgear cabinet is significantly more favourable since material can be saved and production times reduced. Furthermore, the switchgear cabinet may be adapted to different cabinet dimensions without great complexity. The switchgear cabinet can be produced, tested and kept in stock complete with electrics or electronics and without brackets, so that the appropriate brackets can be attached depending on customer preferences.

According to an advantageous embodiment of the invention, only two sides are extended as tabs, e.g. only the side parts or one side part and the bottom part. Furthermore, the end plates may also protrude and serve as tabs for fixing the brackets, as shown for example in FIG. 9. The end plates may also be extended and the side parts folded through 90° so as to create a material doubling for the attachment of the brackets, as shown for example in FIG. 10.

The basic shape of the switchgear cabinet need not be rectangular or square, but may also be polygonal. Additional folds on the base plate and/or end plate may create an additional plane for e.g. a mounting plate or other larger components such as for example battery units, as shown for example in FIG. 11.

Bolts or nuts may be arranged in the cabinet, for example for attaching mounting plates or components. The end plates are preferably welded, but other connecting techniques may be used such as e.g. gluing and/or riveting. Preferred materials are stainless steel or steel, but other materials may be used, such as e.g. plastics which are suitable for use in wind turbines.

The invention is explained below with reference to preferred exemplary embodiments shown on the drawing. The drawing shows.

Figure 1:
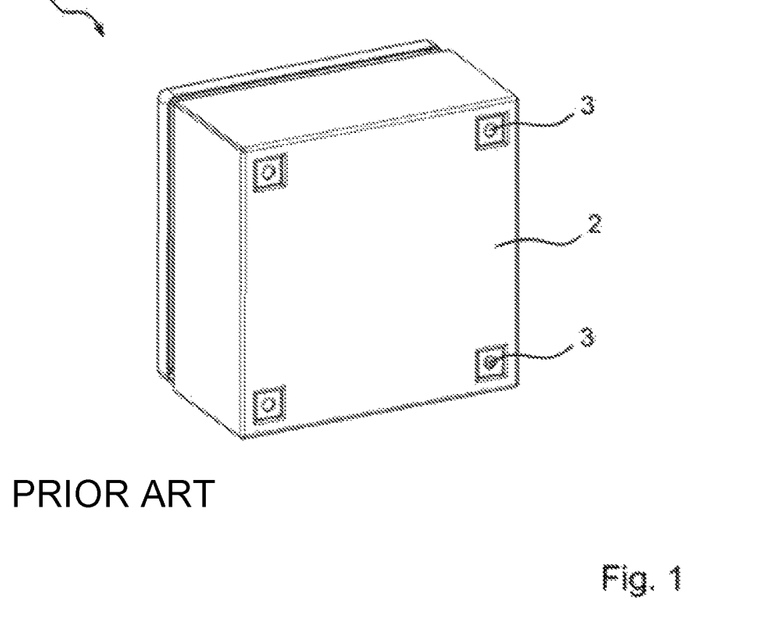
FIG. 1 a conventional electrical switchgear cabinet (pitch control cabinet) for adjusting rotor blades of a wind turbine, arranged in the rotating part thereof, FIG. 2 a conventional switchgear cabinet with brackets welded to a base plate, FIG. 3 a conventional switchgear cabinet with brackets arranged on the sides for fixing, FIG. 4 a perspective view of a switchgear cabinet according to a first embodiment of the invention, FIG. 5 a U-shaped base plate of the switchgear cabinet shown in FIG. 4, FIG. 6 the base plate according to FIG. 5 together with end plates, wherein tabs are arranged on the side parts and on the bottom of the base plate for attaching brackets, FIG. 7 the arrangement according to FIG. 6 according to a first derivative of the first embodiment, wherein other brackets are attached to the tabs, FIG. 8 a perspective view of a switchgear cabinet according to a second derivative of the first embodiment, wherein a bracket plate is attached to the tabs, FIG. 9 a perspective view of a switchgear cabinet according to a second embodiment of the invention, FIG. 10 a perspective view of a switchgear cabinet according to a derivative of the second embodiment, wherein the end plates are extended and the side parts folded through 90°, FIG. 11 a perspective view of a switchgear cabinet according to a third embodiment of the invention, wherein an additional plane for a mounting plate or other larger components is created by additional folds of the base plate, and FIG. 12 a diagrammatic view of a wind turbine with a switchgear cabinet according to the invention.

FIG. 1 shows a perspective view of a conventional switchgear cabinet 1, wherein several mounting openings 3 are provided in a bottom 2 of the switchgear cabinet 1 and extend through the bottom 2 into the interior of the switchgear cabinet 1. Screws may be guided through the mounting openings 3 for fixing the switchgear cabinet to brackets.

Figure 2:
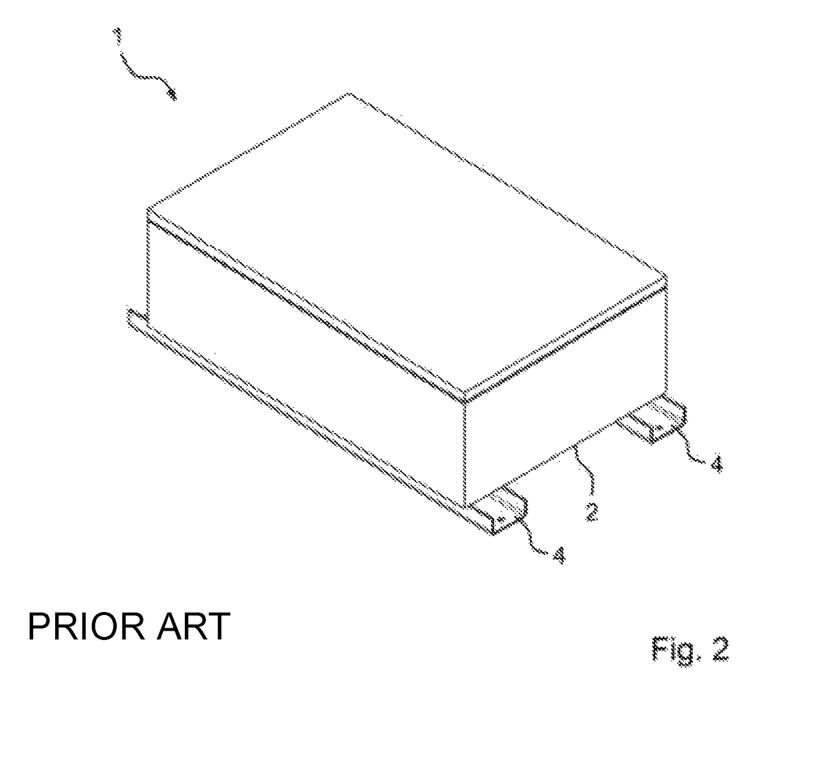
Figure 3:
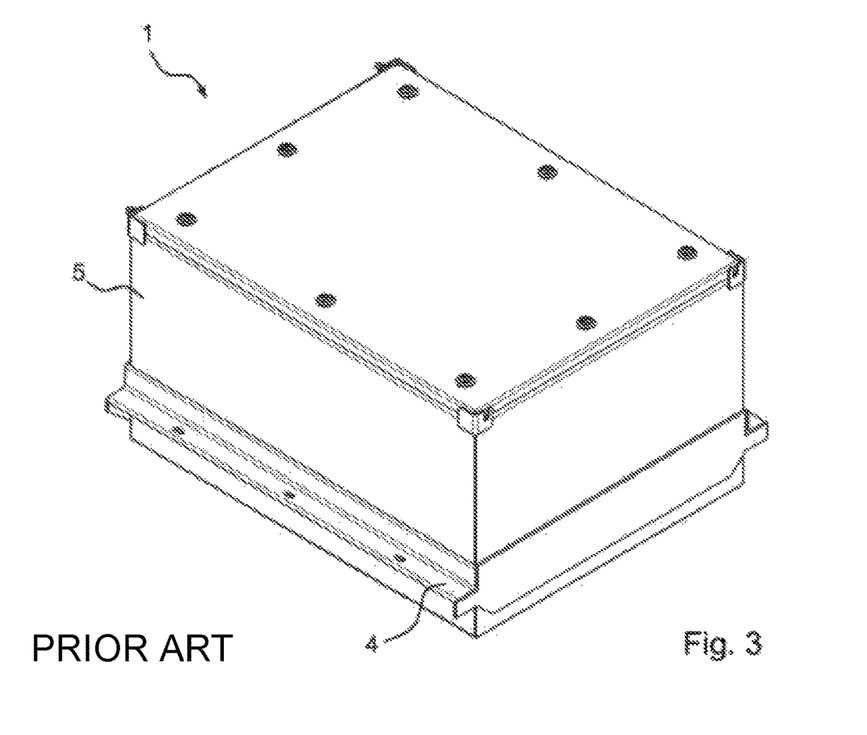

FIG. 2 shows a perspective view of another conventional switchgear cabinet 1, wherein several brackets 4 are welded or bolted to a bottom 2 of the switchgear cabinet 1. Furthermore, FIG. 3 shows a perspective view of a further conventional switchgear cabinet 1, wherein brackets 4 are welded to side faces 5 of the switchgear cabinet 1.

Figure 4:
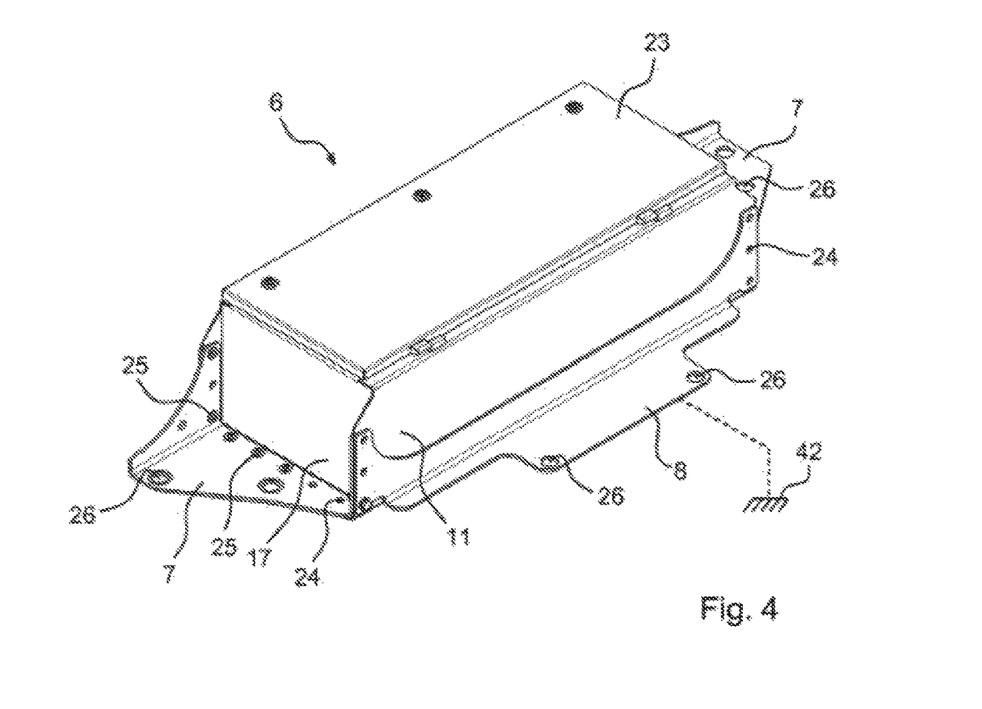

FIG. 4 shows a perspective view of a switchgear cabinet 6 according to a first embodiment, on which several brackets 7 and 8 are attached. The brackets 7 form end brackets, and the brackets 8 form side brackets. The constituents of the switchgear cabinet 6 and the mounting of these constituents in the switchgear cabinet 6 are described below with additional reference to FIGS. 5 and 6.

Figure 5:
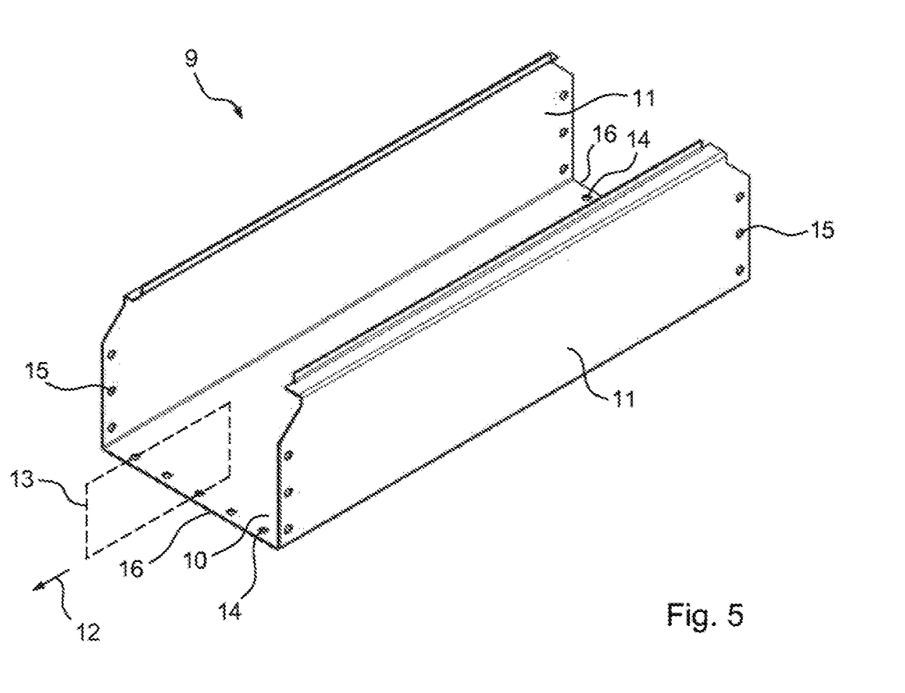

FIG. 5 shows a perspective view of a base plate 9 of the switchgear cabinet 6, comprising a bottom 10 and two opposing side parts 11 which are folded up from the bottom 10. The base plate 9 is open at the ends and/or has two open ends which lie opposite each other in a longitudinal direction 12. Each of these open ends is delimited by the bottom 10 and the side parts 11. The base plate 9 is configured mirror-symmetrically relative to a centre plane 13, indicated merely diagrammatically, which runs in the longitudinal direction 12 and in particular is oriented perpendicular to the bottom 10. The base plate 9 is provided with several holes 14 and 15 at its ends, wherein the holes 14 are provided in the bottom 10 and the holes 15 in the side parts 11. Furthermore, the base plate 9 has outer edges 16 at its ends.

Figure 6:
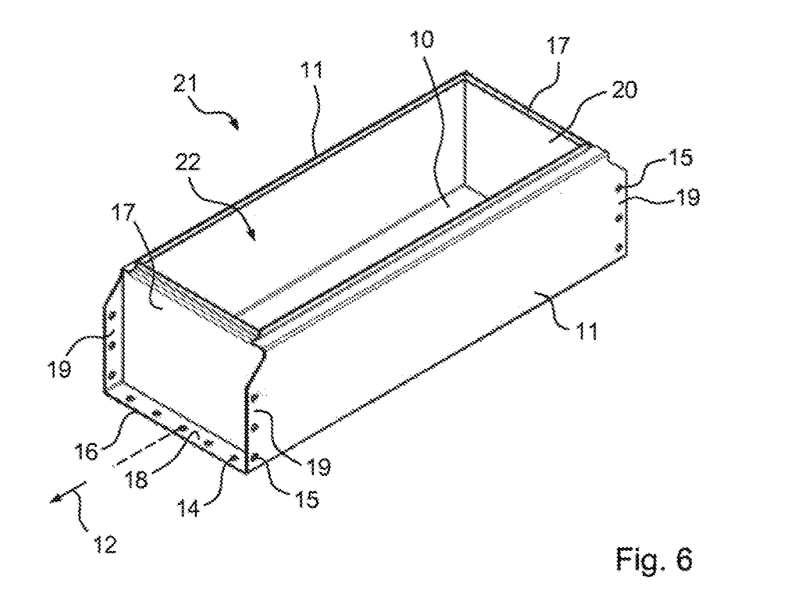

According to FIG. 6, the base plate 9 is closed at the ends and/or the open ends of the base plate 9 are closed by two end plates 17 which are arranged between the side parts 11 and lie opposite each other in the longitudinal direction 12. The end plates 17 are each set back by an in particular defined distance relative to the respective outer edge 16 of the base plate 9, so that the base plate 9 forms outwardly protruding tabs 18 and 19. The tabs 18 are provided on the bottom 10 and the tabs 19 on the side parts 11. Furthermore, the holes 14 and 15 are provided in the tabs 18 and 19, wherein the holes 14 are provided in the tabs 18 and the holes 15 in the tabs 19. The end plates 17 are fixedly connected to the base plate 9, in particular by substance bonding and/or form fit. Preferably, the end plates 17 are welded to the base plate 9.

The end plates 17 together with the base plate 9 form a base body 21, in particular box-shaped, which is closed apart from the switchgear cabinet opening 20 and delimits an interior 22. The switchgear cabinet opening 20 is closed by a cover 23, giving the switchgear cabinet 6 according to FIG. 4. Furthermore, the brackets 7 and 8 are attached to the tabs 18 and 19.

The side parts 11 of the base plate 9 in particular form longitudinal sides of the base plate 9 and/or the base body 21 and/or the switchgear cabinet 6. The bottom 10 of the base plate 9 preferably forms a bottom of the base body 21 and/or the switchgear cabinet 6. Furthermore, the end plates 17 in particular form the ends or closed ends of the base body 21 and/or the switchgear cabinet 6.

According to FIG. 4, the switchgear cabinet opening 20 is closed by the cover 23. The brackets 7 and 8 are furthermore attached to the tabs 18 and 19, for example riveted thereto. Alternatively, the brackets 7 and 8 are e.g. bolted to the tabs 18 and 19. In particular, the brackets 7 and 8 comprise holes 24, which or some of which are brought to overlap with the or with some of the holes 14 and 15, wherein fixing means 25 are guided through the or some of the holes 24 and by means of which the brackets 7 and 8 are attached to the tabs 18 and 19. The brackets 7 are attached to the tabs 18 and 19, and the brackets 8 only to the tabs 19. In particular, the brackets 7 are configured U-shaped and/or U-shaped in cross-section at their end region facing the switchgear cabinet 6 and/or the base body 21. Preferably, the holes 24 are provided in this end region of the brackets 7. Preferably, the fixing means 25 comprise or form rivets and/or bolts.

The switchgear cabinet 6 is or may be attached by means of the brackets 7 and 8 to a rotating part 42 of a wind turbine, indicated merely diagrammatically. For this, the brackets 7 and 8 are provided with fixing holes 26, through which fixing means such as e.g. screws or bolts are or may be guided, by means of which the brackets 7 and 8 are or may be attached to the rotating part 42 of the wind turbine. Preferably, the rotating part 42 forms a rotor hub of the wind turbine. In particular, the switchgear cabinet 6 is arranged in the rotating part 42 of the wind turbine.

Figure 7:
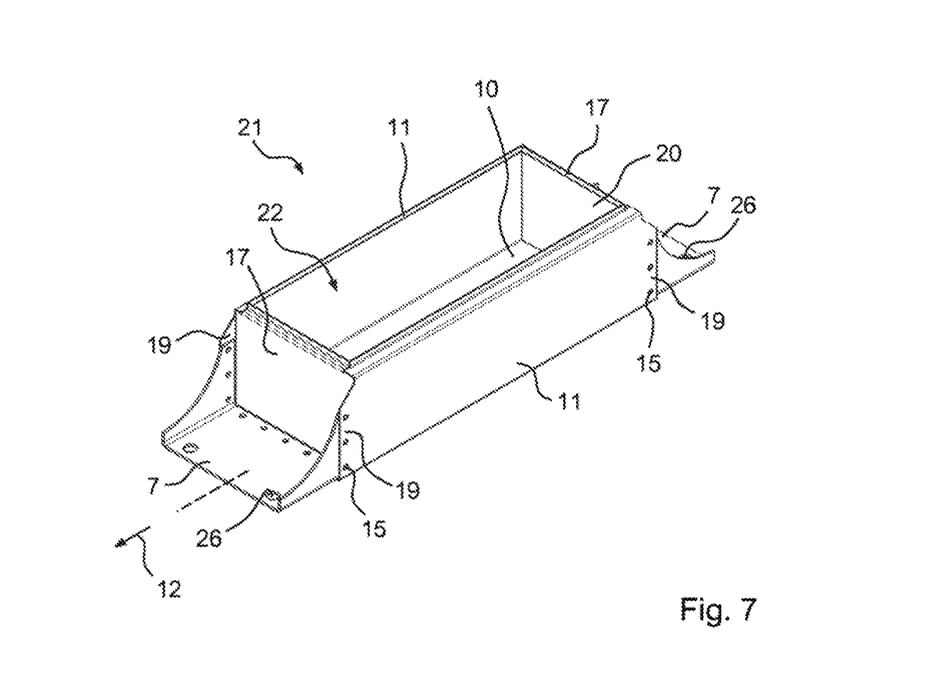

FIG. 7 shows a first derivative of the first embodiment wherein the side brackets are omitted. Only end brackets 7 are provided which are attached to the tabs 18 and 19. Furthermore, fixing holes 26 are provided in the brackets 7. However, the end brackets 7 have a different form from that shown in FIG. 4.

Figure 8:
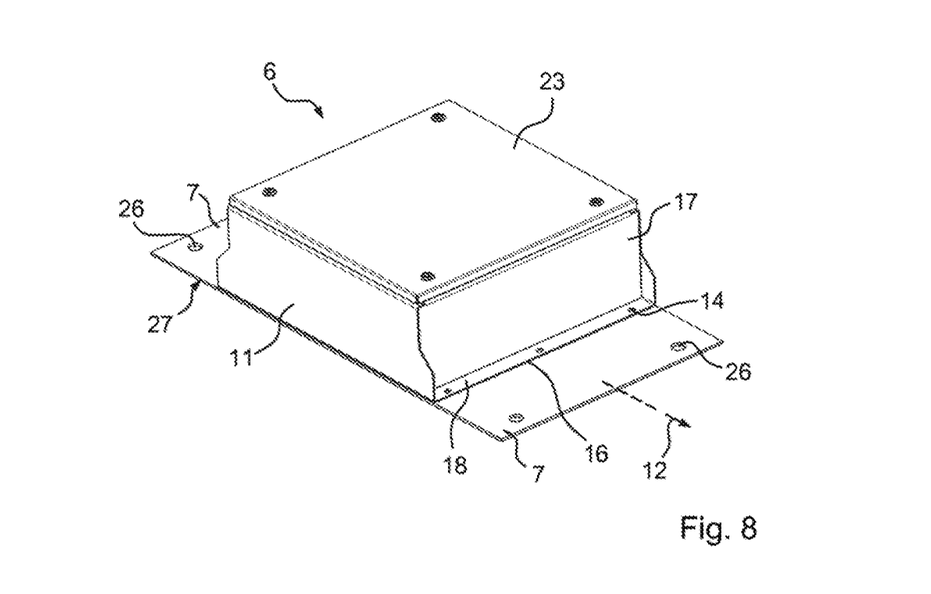

FIG. 8 shows a second derivative of the first embodiment wherein the side brackets are omitted. Only one holder plate 27 attached to the tabs 18 is provided, which protrudes beyond the outer edges 16 at the end and/or in the longitudinal direction 12 and hence forms end brackets 7. The brackets 7 here are therefore not individual components but part of the holder plate 27, which e.g. may also be called the bottom plate. Furthermore, fixing holes 26 are provided in the holder plate 27 and/or in the brackets 7. The brackets 7 in particular each form a flat bracket.

Figure 9:
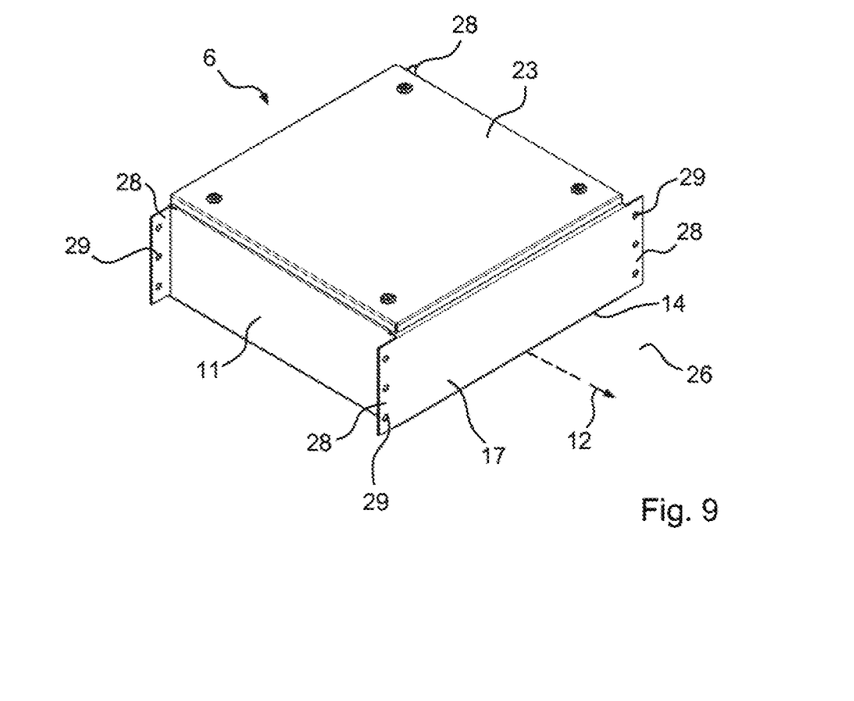

FIG. 9 shows a perspective view of a switchgear cabinet 6 according to a second embodiment of the invention, wherein features identical or similar to the first embodiment carry the same reference signs as in the first embodiment. According to the second embodiment, the end plates 17 are not set back relative to the outer edges of the base plate, but are extended relative to the side parts 11 or the longitudinal sides formed thereby, so that the end plates 17 form outwardly protruding tabs 28. Furthermore, holes 29 are provided in the tabs 28.

Apart from these differences, the second embodiment corresponds in particular to or substantially to the first embodiment, so that for the further description of the second embodiment, reference is made to the description of the first embodiment.

Figure 10:
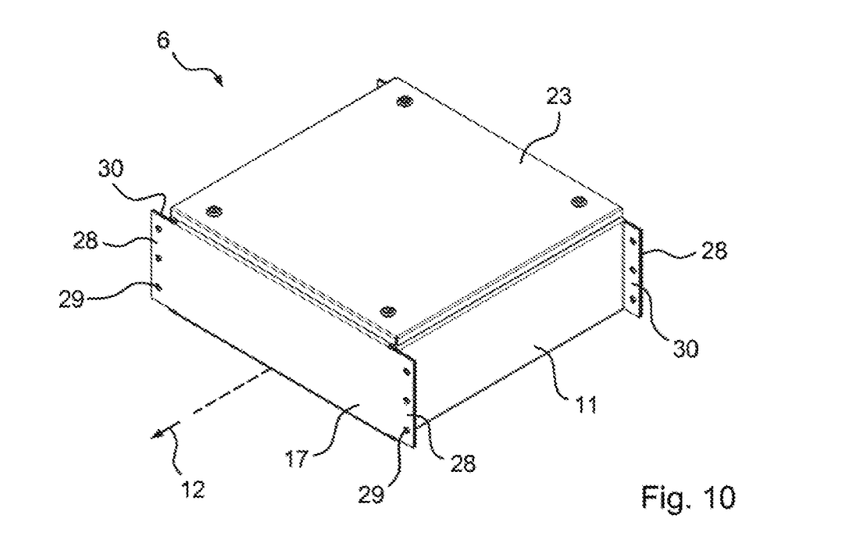

FIG. 10 shows a perspective view of a derivative of the second embodiment, wherein the ends 30 of the side parts 11 are each folded outward by 90°. The folded regions 30 of the side parts 11 lie on the extended regions of the end plates 17, so that the extended regions of the end plates 17 together with the folded regions 30 of the side parts 11 form the tabs 28. Thus the material in the region of the tabs 28 is doubled.

Figure 11:
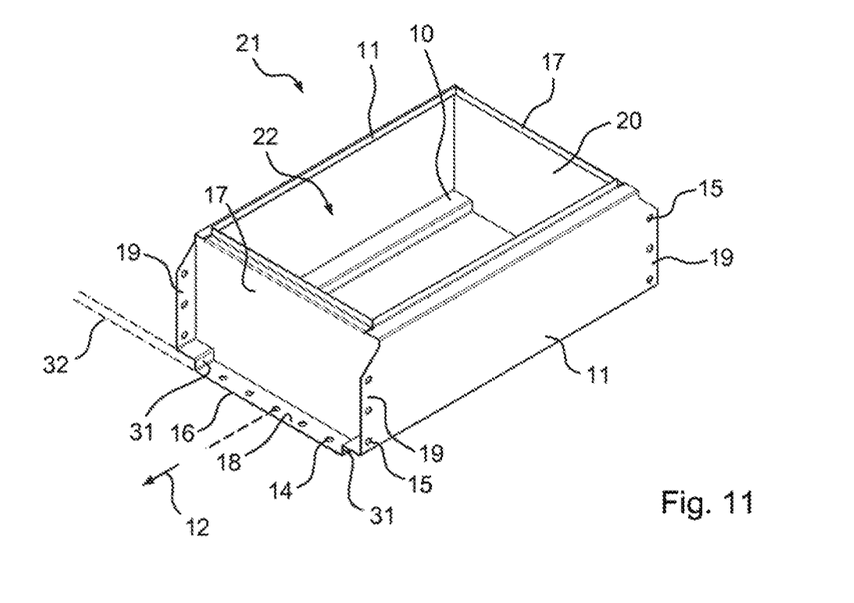

FIG. 11 shows a perspective view of a switchgear cabinet according to a third embodiment of the invention, wherein the cover is not shown, so that FIG. 11 shows only the base body 21 of the switchgear cabinet. According to the third embodiment, additional folds 31 on the base plate 9 create an additional plane 32, indicated merely diagrammatically, for an internal mounting plate or other larger components. Apart from these differences, the third embodiment corresponds in particular to or substantially to the first embodiment, so that for the further description of the third embodiment, reference is made to the description of the first embodiment.

Figure 12:
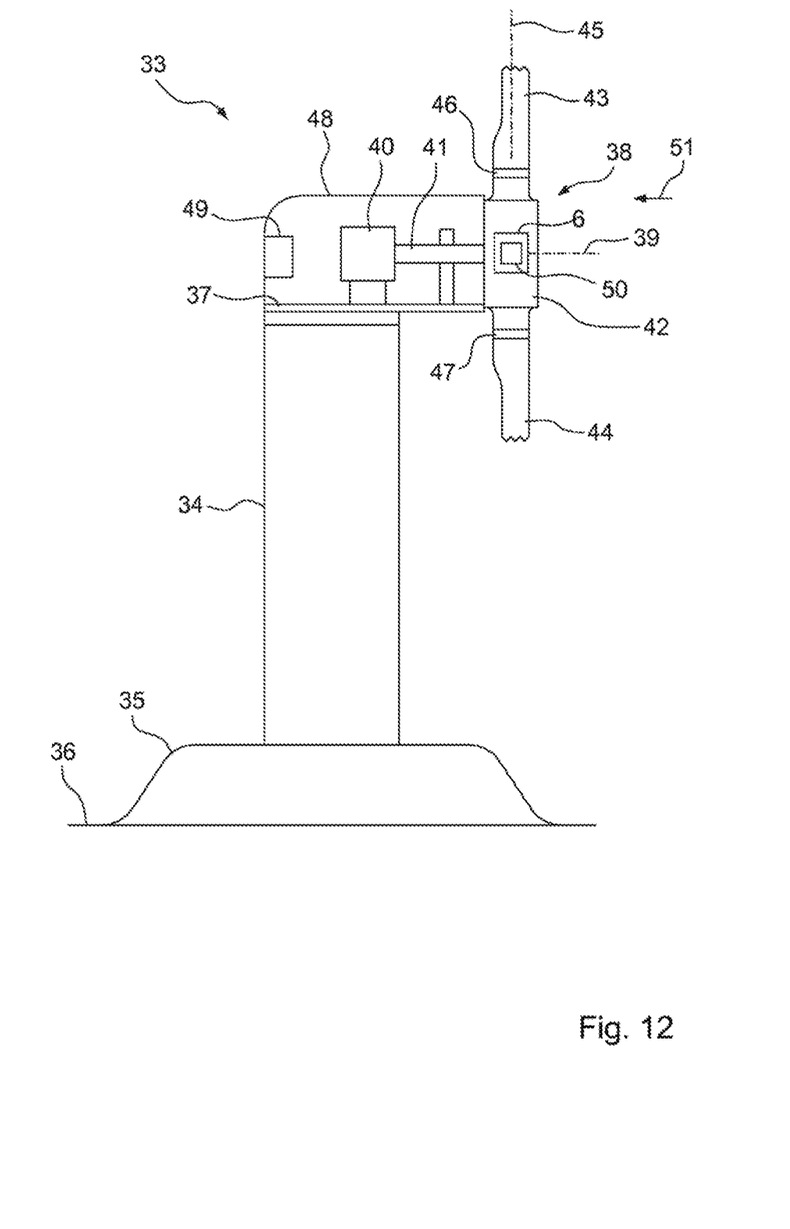

FIG. 12 shows a diagrammatic side view of a wind turbine 33 with a switchgear cabinet 6 according to the invention, which e.g. is a switchgear cabinet according to the first embodiment, the second embodiment or the third embodiment. The wind turbine 33 comprises a tower 34 which is anchored in the ground 36 by means of a foundation 35. At its end facing away from the ground 36, the tower 34 supports a machine carrier 37 on which a rotor 38 is mounted so as to be rotatable about a rotor axis 39. Furthermore, an electrical generator 40 is attached to the machine carrier 37 and connected to the rotor 38 via a rotor shaft 41. The rotor 38 comprises a rotor hub 42 and several rotor blades 43 and 44 which each extend away from the rotor hub 42 along a blade axis running transversely or approximately transversely to the rotor axis 39. The rotor blades 43 and 44 are each mounted on the rotor hub 42 so as to be rotatable about their respective blade axis, wherein FIG. 12 shows only the blade axis 45 of the rotor blade 43. The rotor blades 43 and 44 are rotatably mounted on the rotor hub 42 via a respective blade bearing 46 or 47. The machine carrier 37 carries a machine housing 48 in which an operating and control device 49 is arranged, which forms a general control system for operating the wind turbine 33. Furthermore, the switchgear cabinet 6 is arranged and fixed in the rotor hub 42, providing a pitch angle control system 50 by means of which the pitch angle of the rotor blades 43 and 44 can be controlled. The rotor 38 is driven by wind 51 to rotate about the rotor axis 39.

The invention claimed is:

1. A switchgear cabinet for use with a wind turbine, wherein the wind turbine has a rotating part, the switchgear cabinet comprising:
    a U-shaped base plate having a bottom and two side parts;
    two end plates connected to the base plate;
    a cover which closes the switchgear cabinet, the switchgear cabinet being arranged in the rotating part of the wind turbine and being attached to the wind turbine by at least one bracket;
    the two end plates each being set back by a distance from an outer edge of the base plate, such that the base plate forms three outwardly protruding tabs which are each formed flat and useable for attaching two brackets; and
    wherein each said bracket is attached to three or more tabs and lies with a respective flat contact face on each of the tabs;
    wherein the tabs are formed by the bottom and the side parts;
    wherein the tabs include three outwardly protruding tabs, and the three outwardly protruding tabs form a U-shaped tab arrangement; and
    wherein each said bracket has an end region which faces the switchgear cabinet and is U-shaped, each said bracket being attached to an associated three of the tabs at an associated end region of cabinet.

2. The switchgear cabinet of claim 1, wherein two of the three tabs form a right angle with each other.

3. The switchgear cabinet of claim 1, wherein the at least one bracket comprises a sheet.

4. The switchgear cabinet of claim 1, wherein additional folds are provided on the base plate and/or on at least one of the end plates, so that at least one additional plane is created on the base plate and/or on the two end plates.

5. The switchgear cabinet of claim 1, wherein the two end plates are welded to the base plate.

6. The switchgear cabinet of claim 1, wherein the switchgear cabinet is welded all round apart from the cover.

7. The switchgear cabinet of claim 1, wherein the bottom of the base plate is at least one of rectangular or square.

* * * * *